United States Patent [19]

Wood

[11] Patent Number: 4,851,281

[45] Date of Patent: Jul. 25, 1989

[54] PAPERMAKERS' FELT HAVING COMPRESSIBLE ELASTOMER ELEMENTS AND METHODS OF PRODUCING SAME

[75] Inventor: Thomas A. C. Wood, Arnprior, Canada

[73] Assignee: Huyck Corporation, Wake Forest, N.C.

[21] Appl. No.: 38,017

[22] Filed: Apr. 14, 1987

[51] Int. Cl.⁴ .............................................. D04H 1/16
[52] U.S. Cl. ...................................... 428/282; 156/79; 156/148; 156/307.7; 162/DIG. 1; 428/234; 428/280; 428/286; 428/304.4; 428/316.6; 428/402; 428/423.1
[58] Field of Search ............... 428/304.4, 316.6, 317.1, 428/317.7, 234, 300, 280, 284, 286, 402, 423.1; 162/DIG. 1, 358; 156/148, 79, 307.7

[56] References Cited

U.S. PATENT DOCUMENTS

| | | | |
|---|---|---|---|
| 3,059,312 | 10/1962 | Jamelson | 428/234 |
| 3,617,442 | 11/1971 | Hurchman | 162/212 |
| 4,224,372 | 9/1980 | Romanski | 428/257 |
| 4,271,222 | 6/1981 | Hahn | 428/193 |
| 4,357,386 | 11/1982 | Luciano | 428/234 |
| 4,588,632 | 5/1986 | Gisbourne | 428/222 |
| 4,675,229 | 6/1987 | Westhead | 428/222 |

*Primary Examiner*—James J. Bell
*Attorney, Agent, or Firm*—Lorusso & Loud

[57] ABSTRACT

A papermakers' fabric having at least one layer of elastomeric foam to minimize the amplitude of vibration from the press roll. The elastomeric foam layer may be needled, chemically adhered, attached mechanically or adhered directly to the base fabric and the first batt layer on the paper contacting side of the fabric. A foam layer may also optionally be provided on the transport roll contacting side of the base fabric.

17 Claims, 1 Drawing Sheet

PAPERMAKERS' FELT HAVING COMPRESSIBLE ELASTOMER ELEMENTS AND METHODS OF PRODUCING SAME

BACKGROUND OF THE INVENTION

The field of this invention is felts for use in papermaking machinery, and more particularly, press felts for use in the press section of a papermaking machine.

Generally, press felts are used in papermaking machines to support the moist, freshly formed paper web as it passes through a variety of rolls which extract water from the moist paper web. In addition to supporting the paper web, the press felt receives the water removed from the paper sheet. Thus, the felt should contain voids to hold the water squeezed from the web. The press felt is normally joined into an endless conveyor belt-like shape. During the various operations previously described, a large amount of water builds up in the press felt. The water is removed by suction or various other drainage devices, usually after the paper web and press felt have separated.

The press felt serves several functions and thus, must simultaneously satisfy conflicting requirements. First, it supports the paper web. In order not to unduly mark the paper, the fabric must present a relatively fine weave or fine grain structure to the paper web. Second, the felt must absorb the water pressed out of the paper. Thus it must be absorbent and relatively open woven. Additionally, the felt drives the press rolls. Thus, it must be relatively durable and longitudinally inextensible.

Because the felt serves several functions, multilayer felts have been designed with a fine structured paper-contacting layer (a batt) which is adhered to a relatively incompressible base fabric. The base fabric does not contact the paper web. Other layers, for instance a compressible, absorbant layer, may be sandwiched between the paper-contacting layer and the base fabric.

Features of the felt may also aid in minimizing vibration problems related to the pressing of water from the web. The press section of a papermaking machine includes transport rollers that move the papermaking fabric along, with the paper web supported above the fabric. Above the paper web are arranged several press rolls. An upper press roll is located opposite a cooperating roll located below the papermaking fabric. The purpose of the press roll is to press down upon the wet web and squeeze water out from the paper and into the fabric. The rolls press down with a force of about 700 pounds per lineal inch. Thus, for a roll forty feet wide, the roll experiences 336,000 pounds of force. At the same time, the paper moves past the roll at 1,000 meters per minute. Thus, the press roll is spinning at a high rate, under an extreme load. The roll is supported from above by a frame, with shock absorber type elements interposed between the roll and the frame. However, any slight imbalance in the roll, which invariably arises, causes the press roll to shake and vibrate. Due to the extreme forces, this vibration causes flattening of the roll, which further exacerbates the vibration. Eventually, the roll vibrates to such a degree that the entire portion of the building housing the press section quakes.

Aside from the obvious noise pollution and physical discomfort, a wildly vibrating roll presents several other problems. First, paper manufactured with such a roll is irregular and cannot be used for fine applications. Further the vibration of the roll ruins the rolls, which must be removed and reground to return to a balanced state. Similarly, the vibration loosens many of the components in the papermaking machine itself. The machine then must be frequently serviced. Finally, the vibration causes the papermaking fabric to compact to a certain degree, such that it no longer exhibits the desired drainage and vibration accomodation characteristics.

Mechanical means, such as frequent balancing of the roll and sophisticated shock absorbing systems have been used to minimize the vibration problem.

An attempted solution to overcome this vibration problem has been to modify the felt. According to one method, disclosed in a European Patent No. 0059973, to Dufour, a papermakers' fabric is disclosed having special yarns. The special yarns are each made up of a multiplicity of small diameter fibers, knitted, knit-braided or otherwise stitched to form a substantially hollow, compressible structure. This knitted yarn is woven into a papermaking fabric as a major constituent of the fabric. The fabric may be multi-layer, having at least one layer comprising a large amount of the special yarns. Because the multifilament yarns are compressible and substantially hollow in the relaxed state, they cushion vibration by compressing. A drawback of this special collapsible yarn fabric is that the yarns are relatively complicated to manufacture. Further, this knit-braided structure loses its resilience relatively quickly.

Thus, it is an object of this invention to provide a papermaking fabric for the press section of a papermakers' machine that minimizes the amplitude of the vibration of the press roll.

It is a further object of the present invention to provide such a papermakers' fabric that is relatively inexpensive and easy to manufacture.

Finally, it is an object of the present invention to provide such a fabric that is relatively light weight and easy to install.

SUMMARY OF THE INVENTION

This invention accomplishes the objects set forth above by providing a papermakers' fabric having at least one layer of an elastomeric foam. The elastomeric foam may be needled to the base fabric. It may also be chemically adhered, or attached mechanically through the melting of a relatively low melting point polymer fiber. It has been found that it is most beneficial to place the elastomeric foam layer on the paper contacting side of the base fabric. It is also beneficial, however, in some cases, depending on the position of the dewatering elements, to include a foam layer on the transport roll contacting side of the base fabric.

The invention may also be seen from the following detailed description of the invention and from the following drawing, in which like reference numbers refer to like members in the various figures.

DETAILED DESCRIPTION OF THE PREFERRED EMBODIMENT

The papermaking process entails passing a wet paper web through three different sections of a papermaking machine. The first section, the forming section mainly draws excess water from the web, and compacts the paper fibers into a general web configuration. The second section, known as the press section, presses more water from the web, and brings the paper more closely to the thickness required for a particular use. The final section, the dryer section, removes the remaining water from the paper web by heating processes.

Figure 1:
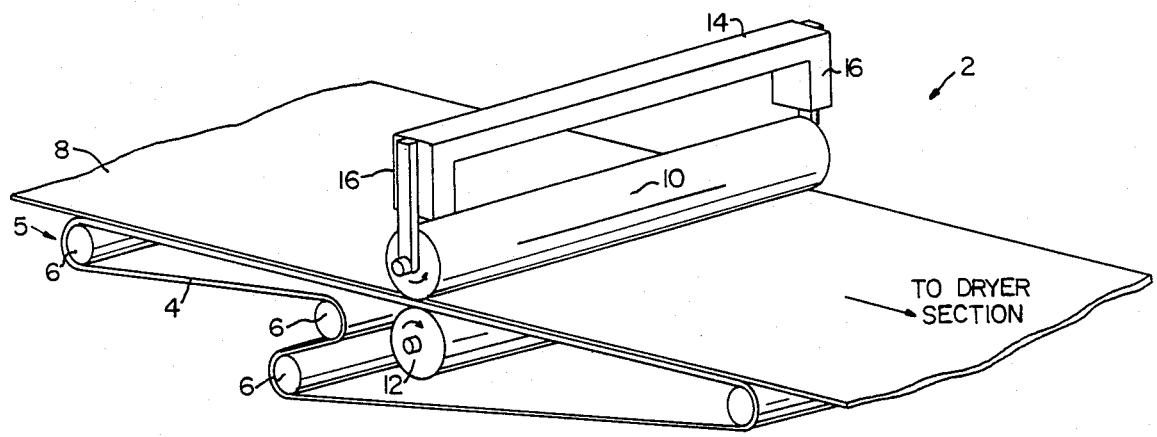
FIG. 1 is a schematic representation of a portion of the press section of a papermakers' fabric, showing the transport rolls, the papermakers' fabric, the paper web and the press roll.

FIG. 1 shows schematically a portion of a press section of a papermaking machine 2. The press section transports a press fabric 4, which travels in a circuit defined by transport rolls 6. The fabric 4 supports a paper web 8, which has come from the forming section (from the left in FIG. 1) and will be passed to the dryer section (to the right in FIG. 1). Water is removed from the paper by the heavy press rolls 10 and 12 shown supported schematically by frame 14 and shock absorbers 16. The rolls 10 and 12 are pressed toward each other at a force of between 600 and 800 pounds per lineal inch. This force per inch translates to a load of over 125 tons in the case of a 40 ft. wide roll. At the same time, the paper moves past the rolls at approximately 1000 meters per minute. At this high speed and load, any slight imbalance in the rolls 10 or 12 could cause an extreme vibration of roll 10 and the support structure frame 14. Vibration of the rolls 10 and 12 also sets off vibration of the entire papermaking machine, and the surrounding room.

It has been found that the present invention provides a superior fabric that reduces or eliminates the risk of vibration and damage to the press rolls. In the fabric of the present invention, a foam layer is placed on the paper contacting side 5 of the fabric to lessen the effect of vibration on the roll 10.

Figure 2:
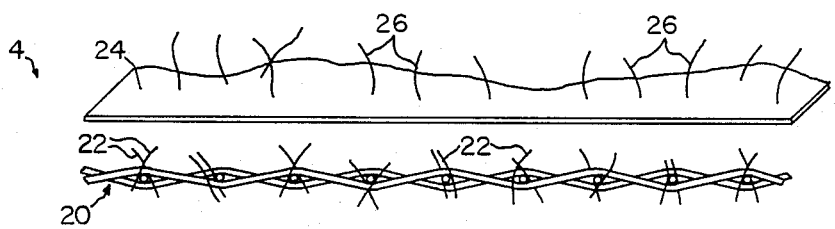
FIG. 2 is an exploded view of one embodiment of the present invention, showing a base fabric, a needled batt layer adjacent thereto, a foam sheet layer and a second needled batt layer which will needle the foam layer to the base fabric.

FIG. 2 shows an exploded view of one embodiment of a papermakers' fabric incorporating the present invention. A woven base fabric 20 is shown, although the base fabric 20 may be nonwoven for the purpose of this invention. A first batt layer 22 is provided adjacent the base fabric 20. This layer 22 is needled to the base fabric 20. A sheet of elastomeric foam 24 is placed on top of the first batt layer 22. A second batt layer 26 is needled through the foam sheet 24, the first batt layer 22 and the base fabric 20. Thus, the second batt layer 26 secures the foam sheet 24 to the base fabric 20.

Figure 3:
FIG. 3 shows the fabric of FIG. 2, assembled.

FIG. 3 shows the embodiment of the invention diagrammed in FIG. 2 in an assembled state.

Figure 4:
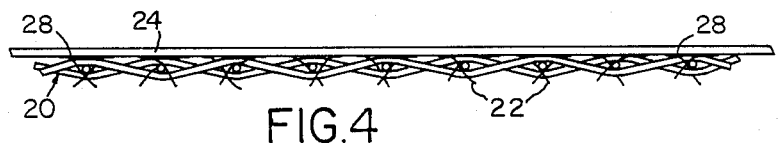
FIG. 4 is a cross-sectional view of another embodiment of the present invention, where the foam layer is attached by needling the foam sheet to the base layer with a low melting temperature material, and melting the material to join the foam to the base layer.

Other methods of affixing the foam layer 24 to the base fabric 20 may be used. For example, a second polymer having a relatively low melting point, such as nylon, may be used to adhere the foam sheet 24, to the base fabric 20. The assembled fabric of this embodiment is shown in FIG. 4. This relatively low melting point polymer 28 may be applied in either the form of a powder between the base fabric 20 and the foam sheet 24, or in fibers which are needled through the foam sheet 24, and into the base fabric 20. The method using fibers is preferred. After needling, or applying the powder, and the sheet of foam 24, the entire structure is cured. The curing process melts the relatively low melting point polymer 28 and the melted polymer 28 binds to both the foam sheet 24 and the base fabric 20, thereby joining the two.

Figure 5:
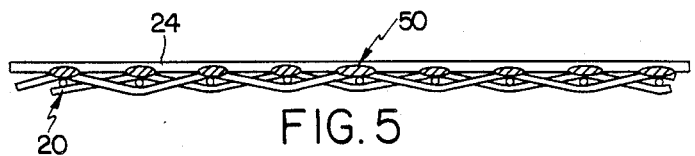
FIG. 5 is a cross-sectional view of another embodiment of the present invention where the foam layer is foamed to the base layer in situ.

According to another method of practicing the invention, shown in FIG. 5, a chemical adhesive 50 may be applied to the base fabric 20 in a paste form. Afterwards, a foam sheet 24 is applied to the chemical adhesive 50. The entire structure is cured, during which process the chemical adhesive 50 becomes tacky, bonds the foam sheet 24 to the base fabric 20, and shrinks away from the opening in the base fabric 20 and the foam sheet 24, to maintain contact only at the fibers of the base fabric 20 and the non-void space of the foam sheet 24.

Figure 6:
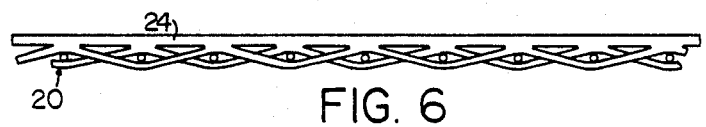
FIG. 6 is an cross-sectional view of still another embodiment of the present invention where the foam layer is attached to the base layer by a chemical paste.

FIG. 6 shows another embodiment of the invention where the foam sheet 24 is actually formed in situ on the base fabric 20. In order to produce this embodiment, a roll former, which mixes the liquid polymer and air and expands this mixture into a foam, applies the mixture right to the base fabric 20. At this point, the foam mixture is tacky and adheres to the base fabric. The foam and base fabric combination is then heated to dry out the remaining solvents and chain extenders in the foam and to create the pore size in the foam, forming the foam sheet 24.

At this point, a brief discussion of the role played by the pore size is appropriate. As is well known to one of ordinary skill in the art, the drainage characteristics of a papermaking fabric greatly affect the quality and type of paper produced on that fabric. These characteristics include the amount of void space per surface area, the amount of void volume per volume of fabric, the average area of a clear path straight through the papermakers' fabric, the relative percentage of fabric area contacting the paper as it relates to the total area of the paper, etc. One of ordinary skill in the art is able to choose the proper configuration of the papermakers' fabric depending upon desired paper characteristics.

The pore size of the foam layer in the present invention plays an analogous role to the open area of a fabric interposed at the same level. The pore size is set during curing and pressing of the foam. After the foam has been spread out, it is cured by heating and the foam shrinks to a degree depending upon the temperature and duration of the cure. These time and temperature characteristics are well known, depending upon the type of elastomer used. As a part of curing, the foam is placed under pressure. The foam reacts to the pressure to a certain extent by assuming and maintaining a particular thickness.

It is important that the elastomeric foam be a tough foam, so that it can withstand the high stresses without breakdown. A suitable foam for the fabric of the present invention can be obtained from Scott Paper Company (Foam Division), 1500 East Second Street, Chester, Pennsylvania 19013, and would be selected as "30 Por Scott Industrial Foam". It has been found that polyurethane foam provides the best results. Other tough elastomers may also be used, such as polypropylene, and a mixture of polyurethane and polyester.

As an example of a suitable elastomeric foam, a segmented polyurethane is used. By "segmented" is meant a polyurethane comprising long flexible sections of a compound joined by urethane bonds to shorter stiffer sections. These bonded regions act as anchor points which prevent the molecules sliding past each other to take up new permanent positions relative to one another. Two classes of compounds, polyesters and polyethers, are commonly used for the soft segment. From these compounds, a prepolymer is formed. The hard segment is created by coupling the prepolymer with a low molecular weight bifunctional compound such as a glycol or diamine. The reaction product is a polymer having hydrogen bonding sites in the form of urethane or urea groups, at least two of which will occur in the resulting hard segment.

The final chain extension stage of the segmented polyurethane may alternatively be carried out by the addition of water to the isocyante-terminated prepolymer, instead of a glycol or a diamine. The formulation is preferred when forming in situ, for example, when a roll former is used. Water may be added for example, in a quantity sufficient to react with a proportion of the terminal isocyanate groups, forming prepolymer molecules with an isocyanate group on one end and an amine group on the other end. When the polymer is heated, the amine and isocyanate groups react to bring about further polymerization and crosslinking of the molecules.

The reaction results in only one urea group for each two isocyanate groups, carbon dioxide being liberated as a byproduct. The evolution of gas during chain extension is desirable in the production of urethane foam.

Temperatures for heat setting should be kept as low as possible, consistent with effective setting.

The foregoing discussion should be taken as illustrative and should not be considered to be limiting in any sense. Variations will be evident to those ordinarily skilled in the art. For instance, in addition to use in the press section of the papermaking machine, the present invention may also be used in the dryer section, where the improved heat retention characteristics of the fabric will quicken drying. Further, the foam layer may be placed on the transport roll contacting side of the fabric. Although, in this location, the foam layer will have a lesser vibration dampening effect, it will still provide substantial aid.

What is claimed is:

1. A papermaker's fabric for use in the press section of a papermaker's machine, comprising:
    a base layer;
    at least one batt layer; and
    a continuous layer of foam arranged on a side of said base layer that contacts the paper to be produced.

2. The papermakers' fabric of claim 1 wherein a first batt layer is needled directly to the base layer, said continuous foam layer is provided adjacent the exposed side of said first batt layer, and a second batt layer is provided on the exposed side of said continuous foam layer and is needled through said continuous foam layer and said first batt layer to said base layer.

3. The papermakers' fabric of claim 2 wherein said second batt layer comprises relatively low melting point polymer fibers and said fabric is heated to above the melting point of the fibers of said second batt layer.

4. The papermakers' fabric of claim 2 wherein said second batt layer comprises a relatively low melting point polymer powder, and said fabric is heated to above the melting point of the powder after assembly thereof.

5. A papermakers' fabric for use in the press section of a papermakers' machine comprising:
    a base layer and a continuous foam layer wherein said continuous foam layer is adhered to said base layer by a chemical adhesive.

6. A papermakers' fabric for use in the press section of a papermakers' machine, comprising:
    a base layer; and
    a continuous foam layer;
    wherein said continuous foam layer is adhered directly to said base layer.

7. The papermakers' fabric of claim 2 wherein said foam is polyurethane.

8. The papermakers' fabric of claim 5 wherein said foam is polyurethane.

9. The papermakers' fabric of claim 6 wherein said foam is polyurethane.

10. The papermakers' fabric of claim 3, wherein said relatively low melting point fibers are selected from the group consisting of nylon and polypropylene.

11. A method for manufacturing a papermakers' fabric comprising the steps of:
    providing a base layer;
    providing at least one batt layer;
    providing, on the paper contacting side of said base layer, a continuous foam sheet layer; and
    joining said base layer, said at least one batt layer and said continuous foam layer.

12. A method of manufacturing a papermakers' fabric comprising the steps of:
    providing a base layer;
    needling a batt layer to one side of said base layer;
    providing a continuous foam sheet layer adjacent the exposed side of said batt layer;
    providing a second batt layer on the exposed side of said continuous foam sheet layer; and
    needling the second batt layer through said continuous foam layer and said first batt layer and said base fabric.

13. A method of manufacturing a papermakers' fabric comprising the steps of:
    providing a base layer;
    foaming a continuous layer of polyurethane foam in situ directly onto said base layer; and
    heating said foam and base layer to dry the foam and shrink it to a sheet having a specific pore size.

14. The method of manufacturing a papermakers' fabric of claim 11 further comprising:
    providing a second batt layer on the exposed side of said continuous foam sheet layer, said second batt layer comprising fibers having a low melting point relative to the melting points of the base layer, first batt layer and continuous foam layer;
    needling said second batt layer through said continuous foam layer, said first batt layer and said base fabric; and
    heating said fabric, continuous foam layer and needled first and second batt layers to a temperature above the melting point of said low melting point fibers, and below the melting point of said base fabric, continuous foam layer and needled first batt layer so that the second batt layer melts and adheres to said continuous foam sheet and said base fabric.

15. The method of claim 11 wherein said foam is polyurethane.

16. The method of claim 14 wherein said second batt layer comprises nylon.

17. A method of forming a papermakers' fabric comprising:
   providing a base layer;
   coating said base layer on one side with a chemical adhesive paste;
   applying a continuous foam sheet layer to the exposed side of said layer of chemical adhesive paste; and
   heating said base layer, continuous foam layer and said chemical adhesive paste to a temperature sufficient to cure said chemical adhesive paste, thereby adhering said continuous foam layer to said base layer.

* * * * *